Sept. 12, 1939. F. J. YAWMAN Re. 21,205
REINFORCED FILE FOLDER
Original Filed March 27, 1933
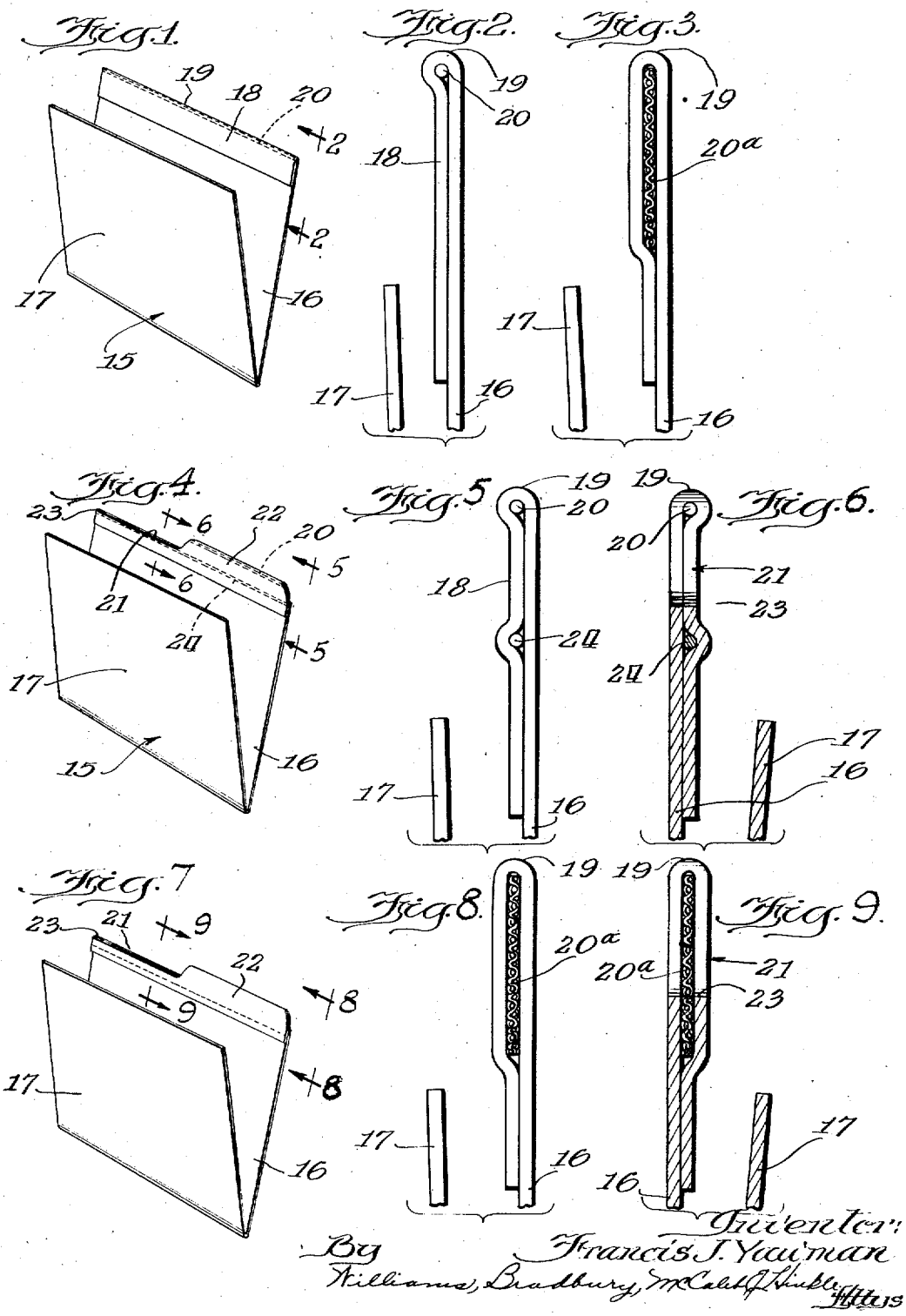
Inventor:
Francis J. Yawman
By
Williams, Bradbury, McCaleb & Hulley
Attys Reissued Sept. 12, 1939

Re. 21,205

UNITED STATES PATENT OFFICE 21,205

REINFORCED FILE FOLDER

Francis J. Yawman, Rochester, N. Y., assignor to Yawman & Erbe Mfg. Co., Rochester, N. Y., a corporation of New York Original No. 2,062,436, dated December 1, 1936, Serial No. 662,948, March 27, 1933. Application for reissue November 30, 1938, Serial No. 243,247

22 Claims. (Cl. 129—16.8)

My invention relates to reinforced file folders. It is concerned especially with a reinforcement for the upper edge of the back leaf of the folder to prolong the wear of the edge and to resist tearing or "dog-earing". One phase of my invention is concerned with a cut-out upper edge for the back leaf leaving a tab, where both the top edge of the tab and the top edge of the cut-away region are similarly reinforced. A further feature of my invention is reinforcing of the top edge of the folder without increasing the aggregate width of a stack of empty folders.

The foregoing, together with further objects, features and advantages of my invention are set forth in the following description of specific embodiments thereof and illustrated in the accompanying drawing wherein:

Fig. 1 is a perspective view of a straight-topped or untabbed file folder embodying one form of reinforcement of my invention;

Fig. 2 is a fragmentary end view on an enlarged scale taken on the line 2—2 of Fig. 1;

Fig. 3 is an end view similar to Fig. 2 but showing a modified form of reinforcement;

Fig. 4 is a perspective view similar to Fig. 1 but showing a tabbed file folder;

Fig. 5 is a fragmentary end view on the line 5—5 of Fig. 4;

Fig. 6 is a cross section view taken on the line 6—6 of Fig. 4 and looking in a direction opposite from Fig. 5;

Fig. 7 is a perspective view similar to Fig. 4 of a tabbed folder but showing still another form of reinforcement incorporated therein;

Fig. 8 is a fragmentary end view on an enlarged scale taken on the line 8—8 of Fig. 7; and Fig. 9 is a sectional view on the line 9—9 looking in a direction opposite from that of Fig. 8.

The file folder 15 shown in Fig. 1 comprises a main or back leaf 16 and an auxiliary or front leaf 17, the two leaves preferably being formed from a single sheet and folded along the bottom edge. The back leaf 16 carries an integral extension in the form of a return flap 18 folded back upon and pasted down on to the back leaf 16 at the side thereof which faces the front leaf 17. This leaves a folded upper edge 19 for the back leaf. The front leaf, as is usual, is of lesser height than the back leaf, so that the front face of the return flap 18 may constitute an index space. Preferably the front leaf is of a height sufficient to overlap the lower edge of the return flap 18 so that when the upper edges of the back and front leaves are grasped between the thumb and finger in lifting the file, the region of grasp may come at the region reinforced by the return flap 18.

Before the return flap 18 is folded over and pasted down, a reinforcing thread 20 is set to come in the bight of the fold. As a matter of manufacture, the thread 20 may be laid in position after the paste or other adhesive, which has been applied to paste the return flap 18 down on to the face of the back leaf 16 has been applied, so that the adhesive will hold the thread 20 in place during the folding and sealing operation. The thread is preferably relatively strong as compared with its size, that is, it is employed for strength rather than for bulk. However, the diameter of the thread, which may be in the order of the thickness of the stock—usually manila stock—is of sufficient diameter to constitute something of a mandrel over which the fold 19 is formed. This substantial diameter of the thread 20 thus results in a number of advantages. One is that the stock is not so easily broken in forming and creasing the fold, and if the original surface is left unbroken at the fold, the upper edge does not wear away so quickly. And it is the upper edge that is subjected to the greatest surface wear. Another advantage is that if the surface is not broken at the fold, there is less danger of the fold splitting, revealing two raw edges which tend to tear apart against the adhesion of the paste. Still another advantage is that the slight bulk of the thread 20 forms a slight bead at the upper edge which makes it easier to get a firm grasp on the file in pulling it out of a filing cabinet. Even though the operator initially grasped the file below this bead, if there is a tendency to slip, the bead offers an effective last chance for a firm hold. Thus files are not so easily dropped. The upper edge of the front flap 17 does not overlap the increased thickness at the bead 20. If the thread is of about the same diameter as the thickness of the stock, the thickness at the bead will be about the same thickness as that at the region where the front leaf overlaps the lower edge of the return flap 18. Thus the over-all thickness of a stack of file folders is no greater because of the inclusion of the thread 20 despite the increased thickness given to the upper edge.

The bulk of diameter of the thread 20 performs another function in adding strength to the upper edge of the back leaf. It conforms the upper folded edge 19 to a tubular shape. A tubular shape has greater strength against bending than would a flat creased fold. This is in addition to the resistance of the thread 20 itself to bending.

In addition to forming the bead at the fold with its attendant advantages, the thread 20 in and of itself reinforces the upper edge in a number of ways. First, whatever resistance the thread itself has to bending, tends to prevent the folding of "dog-earing" of the upper edge transversely to the direction of the thread. The thread effectively prevents practically all tearing of the upper edge. It acts as a stop, because of its strength, beyond which a tear could not go. Because it is so close to the folded edge, it makes it very difficult for a tear to start to progress even as far as the thread. Even if there were a tear through the stop for some distance down from the edge, the thread would hold the respective sides of the tear together and in alignment, so that it would be difficult for the tear to progress any further.

The bead formed at the upper edge as a result of the thread 20 is also of advantage in affording a more secure anchorage for the clip or "flag" signals freely applied to folders.

In Fig. 3 I have shown a modification where the reinforcing member instead of being a thread is a tape 20*a* of fabric or paper of considerable width but terminating short of the upper edge of the front leaf 17 so as not to increase the over-all thickness of the folder when flat. If paper be used instead of fabric in the form of Fig. 3, it may be of kraft paper, which has more strength in proportion to its thickness than does the manila stock.

In Figs. 4, 5 and 6, I have shown my invention applied to the instance of a tabbed folder, where a portion 21 of the upper edge of the back leaf 16 and the return flap 18 is cut away leaving in effect a protruding tab 22 and a cut-out edge 23. In such instance the thread 20 is pasted into the bight of the fold and the cutaway portion cut out after the return flap 18 has been pasted down.

For reinforcing the non-folded edge 23 left at the cut-out region 21, and for further reinforcing the tab 22, I prefer to use a second thread 24. The second thread 24 is spaced downwardly from the first thread 20 and comes at a height a short distance below the raw edges 23 of the cutaway region. The second thread, like the first thread, is preferably held in position by the adhesive and pasted between the back leaf and the return flap when the latter is pasted down. As shown in Figs. 4, 5 and 6, a second thread 24 is spaced down from the edge 23 a sufficient distance to leave a substantial region for the flap to be pasted to the back leaf above the thread 24. This lessens the danger of the thread being torn out from between the flap and the back leaf at the cutaway region 21. Narrow tapes may be substituted for the threads 20 and 24.

In Figs. 7, 8 and 9, I have shown the wide fabric or paper tape 20*a* of Fig. 3 incorporated in a tab folder. In this instance the tape 20*a* is of sufficient width to serve as a reinforcement not only for the tab 22 but for the edges 23 at the cutaway region 21. In this instance, as shown in Fig. 9, the reinforcing piece extends all of the way to the edge 23, and the upper edge of the tab is not pasted to the upper edge of the back piece above the reinforcing member.

While I have illustrated my invention as applied to a file folder having a front leaf 17, I contemplate that many of the benefits of my invention will be retained where no front leaf 17 is employed, but where the back leaf alone is used either as a holder for correspondence and the like or as a file guide.

Having thus described my invention what I claim is:

1. A file folder comprising a single sheet of heavy paper stock having lateral edges of single thickness and folded along a horizontal line perpendicular to the lateral edges to provide a back leaf and a shorter front leaf hinged together at the fold, and folded along an upper horizontal line above the upper edge of the front leaf to provide a return flap for the back leaf pasted down to the front side of the back leaf in vertically overlapping relation to the upper edge of the front leaf, and a flexible thread-like strand running along, and embraced in, the bight formed by the back leaf and return flap at the said upper line of fold and conforming the exterior of the fold to an enlarged running bead, the exposed surface of the stock along the bead being unbroken.

2. A file folder comprising a single sheet of heavy paper stock folded along a horizontal line to provide a back leaf and a shorter front leaf hinged together at the fold, and folded along an upper horizontal line above the upper edge of the front leaf to provide a return flap for the back leaf pasted down to the front side of the back leaf adjacent the lower edge of the flap, the lower edge of the flap being in vertically overlapping relation to the upper portion of the front leaf, and a fibrous flat flexible fabric strip disposed between the flap and the back leaf and extending downwardly from the bight of the fold between the flap and the back leaf, to a point above the upper edge of the front leaf, and extending substantially the length of the back leaf.

3. A file folder comprising a single sheet of heavy paper stock folded along a horizontal line to provide a back leaf and a shorter front leaf hinged together at the fold, and folded along an upper horizontal line above the upper edge of the front leaf to provide a return flap for the back leaf pasted down to the front side of the back leaf adjacent the lower edge of the flap, the lower edge of the flap being in vertically overlapping relation to the upper portion of the front leaf, and a fibrous flat flexible reinforcing strip disposed between the flap and the back leaf and extending downwardly from the bight of the fold between the flap and the back leaf, to a point above the upper edge of the front leaf, and extending substantially the length of the back leaf.

4. A file folder comprising a single sheet of heavy paper stock folded horizontally to provide a back leaf and a front leaf, the back leaf extending higher than the front leaf, a reinforcing strip of paper stock pasted to one side of the back leaf and extending downwardly from its upper edge, and a pair of vertically spaced flexible fibrous reinforcing threads disposed between the back leaf and the reinforcing strip, the upper of said threads extending substantially the length of the upper edge of the back leaf and the lower thread extending substantially the length of the back leaf.

5. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a flexible strand extending along the bight of the fold and between the leaf and return flap, and a second flexible strand also between the leaf and flap spaced downwardly from the first strand and extending substantially the length of the leaf and below the cut away portion.

6. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a flexible strand extending along the bight of the fold and between the leaf and return flap, and a second flexible strand also between the leaf and flap spaced downwardly from the first strand and extending at least substantially the length of the cut away portion.

7. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a flexible strand extending along the bight of the fold and between the leaf and return flap, and a second flexible strand also between the leaf and flap spaced downwardly from the first strand and extending at least substantially the length of the cut away portion for reinforcing the upper edge of the leaf along the cut away portion.

8. A file folder comprising a single sheet of heavy paper stock having lateral edges of single thickness and folded along a horizontal line perpendicular to the lateral edges to provide a back leaf and a front leaf hinged together at the fold, and folded along an upper horizontal line about the upper edge of the back leaf to provide a return flap for the back leaf pasted down upon a side of the back leaf in vertically overlapping relation to the upper edge of the front leaf, a portion of the length of the upper edge of the back leaf being cut away leaving a tab portion including the fold, and a flexible thread-like strand running along, and embraced in, the bight formed by the back leaf and return flap at the upper line of fold and conforming the exterior of the fold to an enlarged running bead, the exposed surface of the stock along the bead being unbroken.

9. A file folder comprising a single sheet of heavy paper stock folded horizontally to provide a back leaf and a front leaf, the back leaf extending higher than the front leaf, an integral portion of the back leaf being bent downwardly along its upper edge to provide an integral return flap, the return flap being pasted to the front face of the back leaf, a pair of vertically spaced flexible fibrous reinforcing threads disposed between the back leaf and the flap, the upper of said threads extending substantially the length of the upper edge of the back leaf and in the bight of the fold of the flap, and the lower thread extending substantially the length of the back leaf, the upper edge of the front leaf overlapping the lower portion of the flap but terminating short of the lower thread, whereby the front leaf is in non-overlapping relation to the threads.

10. A file folder comprising a single sheet of heavy paper stock having lateral edges of single thickness and folded along a horizontal line to provide a back leaf and a front leaf hinged together at their bottoms by the fold, and folded forwardly and downwardly along an upper horizontal line to provide a return flap for the back leaf at the front side thereof, and filler means of the class comprising threads, strands and tapes, extending longitudinally of the flap fold and between the back leaf and flap adjoining the flap fold and conforming to the exterior of the flap fold to a thickened edge the exposed surface of the stock of which remains unbroken, the flap being adherently secured to the back leaf below the filler means and the lower edge of the filler means conforming the flap to a downwardly facing shoulder affording a non-slip finger engagement for lifting the back leaf, the upper end of the front leaf overlapping the lower end of the flap but terminating short of the filler means at such distance therefrom that, in lifting the file folders, the operator's fingers may simultaneously engage the downwardly facing shoulder of the flap and the upper end of the front leaf horizontally opposite the flap at the region of its said securement to the back leaf.

11. A file folder comprising a single sheet of heavy paper stock folded along a horizontal line to provide a back leaf and a shorter front leaf hinged together at the fold, and folded along an upper horizontal line above the upper edge of the front leaf to provide a return flap for the back leaf pasted down to the front side of the back leaf adjacent the lower edge of the flap, the lower edge of the flap being in vertically overlapping relation to the upper portion of the front leaf, and a fibrous flat flexible fabric strip disposed between the flap and the back leaf and extending substantially the length of the upper edge of the back leaf and between the flap and back leaf but above the height of the front leaf.

12. A file folder comprising a single sheet of heavy paper stock folded along a horizontal line to provide a back leaf and a shorter front leaf hinged together at the fold, and folded along an upper horizontal line above the upper edge of the front leaf to provide a return flap for the back leaf pasted down to the front side of the back leaf adjacent the lower edge of the flap, the lower edge of the flap being in vertically overlapping relation to the upper portion of the front leaf, and a flexible thread-like strand running along substantially the length of the upper end of the back leaf and between the flap and back leaf but above the height of the front leaf.

13. A file folder comprising a single sheet of heavy paper stock folded horizontally to provide a back leaf and a front leaf, the back leaf extending higher than the front leaf, an integral portion of the back leaf being bent downwardly along its upper edge to provide an integral return flap, the return flap being pasted to the front face of the back leaf, a pair of vertically spaced flexible fibrous reinforcing threads disposed between the back leaf and the flap, the upper of said threads extending substantially the length of the upper edge of the back leaf, and the lower thread extending substantially the length of the back leaf, the upper edge of the front leaf overlapping the lower portion of the flap but terminating short of the lower thread, whereby the front leaf is in non-overlapping relation to the threads.

14. A file folder comprising a single sheet of heavy paper stock having lateral edges of single thickness and folded along a horizontal line to provide a back leaf and a front leaf hinged together at their bottoms by the fold, and folded forwardly and downwardly along an upper horizontal line to provide a return flap for the back leaf at the front side thereof, and filler means of the class comprising threads, strands and tapes, extending longitudinally of the flap fold and between the back leaf and flap, the flap being adherently secured to the back leaf below the filler means and the filler means conforming the flap to a downwardly facing shoulder affording a non-slip finger engagement for lifting the back leaf, the upper end of the front leaf overlapping the lower end of the flap but terminating short of the filler means at such distance therefrom that, in lifting the file folders, the operator's fingers may simultaneously engage the downwardly facing shoulder of the flap and the upper end of the front leaf horizontally opposite the flap at the region of its said securement to the back leaf.

15. A vertically disposed file leaf comprising a sheet of heavy paper stock folded along its upper edge to provide an integral return flap, the return flap being pasted to one face of the leaf, a portion of the length of the upper edge of the leaf being cut away leaving an imperforate two-ply tab portion including the fold, and a reinforcing element of the class comprising threads, tapes and strands extending parallel with, but spaced downwardly from, the fold and between the leaf and flap, substantially coextensive, longitudinally, with at least the region beneath the tab portion, and the flap of the tab portion being pasted to the tab portion of the leaf above the element.

16. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a reinforcing element of the class comprising threads, tapes and strands, extending beneath, and at least substantially coextensive longitudinally with, the cut-out portion and between the leaf and flap, the flap being pasted to the leaf both above and below the element.

17. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a reinforcing element of the class comprising threads, tapes and strands, extending substantially the length of the leaf and between the leaf and flap, the flap being pasted to the leaf both above and below the element.

18. A vertically disposed file leaf comprising a sheet of heavy paper stock folded along its upper edge to provide an integral return flap, the return flap being pasted to one face of the leaf, a portion of the length of the upper edge of the leaf being cut away leaving an imperforate two-ply tab portion including the fold, and a reinforcing element of the class comprising threads, tapes and strands extending parallel with, but spaced downwardly from, the fold and between the leaf and flap, substantially coextensive, longitudinally, with at least the region beneath the tab portion, and the flap of the tab portion being pasted to the tab portion of the leaf above the element, and conforming an exposed surface of the stock to a running down-facing shoulder.

19. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a reinforcing element of the class comprising threads, tapes and strands, extending beneath, and at least substantially coextensive longitudinally with, the cut-out portion and between the leaf and flap, the flap being pasted to the leaf both above and below the element, and the element conforming an exposed surface of the stock to a running down-facing shoulder.

20. A vertically disposed file leaf comprising a sheet of heavy paper stock folded along its upper edge to provide an integral return flap, the return flap being pasted to one face of the leaf, a portion of the length of the upper edge of the leaf being cut away leaving a tab portion including the fold, a reinforcing element of the class comprising threads, tapes and strands, extending substantially the length of the leaf and between the leaf and flap, the flap being pasted to the leaf both above and below the element, and the element conforming an exposed surface of the stock to a running down-facing shoulder.

21. A vertically disposed file leaf comprising a sheet of heavy paper stock folded along its upper edge to provide an integral return flap, the return flap being pasted to one face of the leaf, a reinforcing element of the class comprising threads, tapes and strands extending substantially the length of the leaf and between the leaf and flap, the flap being pasted to the leaf both above and below the element.

22. A vertically disposed file leaf comprising a sheet of heavy paper stock folded along its upper edge to provide an integral return flap, the return flap being pasted to one face of the leaf, a reinforcing element of the class comprising threads, tapes and strands extending substantially the length of the leaf and between the leaf and flap, the flap being pasted to the leaf both above and below the element, and the element conforming an exposed surface of the stock to a running down-facing shoulder.

FRANCIS J. YAWMAN.